(12) United States Patent
Jung

(10) Patent No.: US 7,176,986 B2
(45) Date of Patent: Feb. 13, 2007

(54) PROJECTION TELEVISION

(75) Inventor: Sung-soo Jung, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 602 days.

(21) Appl. No.: 10/453,504

(22) Filed: Jun. 4, 2003

(65) Prior Publication Data

US 2004/0041953 A1   Mar. 4, 2004

(30) Foreign Application Priority Data

Aug. 31, 2002 (KR) ............... 10-2002-0052345

(51) Int. Cl.
H04N 5/74 (2006.01)
H04N 5/64 (2006.01)

(52) U.S. Cl. ............ 348/787; 348/789; 348/836; 348/843; 348/778; 353/74; 353/119

(58) Field of Classification Search ........... 348/787, 348/789, 778, 794, 836, 839, 843, 744, 756; 353/67, 71, 72, 74, 119; 359/443, 449, 453
See application file for complete search history.

(56) References Cited

U.S. PATENT DOCUMENTS

| | | | |
|---|---|---|---|
| 4,394,681 A | | 7/1983 | Rowe |
| 4,643,493 A | | 2/1987 | Sides, Sr. et al. |
| 4,701,801 A | | 10/1987 | Hobbins |
| 4,707,746 A | * | 11/1987 | Nishikawa ............ 348/787 |
| 5,402,263 A | * | 3/1995 | Kita et al. ............. 359/451 |
| 5,559,564 A | | 9/1996 | Nomura |
| 5,582,473 A | * | 12/1996 | Toide et al. ............. 353/74 |
| 5,590,943 A | * | 1/1997 | Yoshida et al. .......... 353/74 |
| 5,786,933 A | | 7/1998 | Iwai et al. |
| 5,808,704 A | | 9/1998 | Yoshikawa |
| 6,412,952 B1 | | 7/2002 | Jung |
| 6,545,729 B1 | | 4/2003 | Lowe |
| 6,616,283 B1 | | 9/2003 | Takano |
| 6,633,346 B1 | * | 10/2003 | Yamamoto ............ 348/744 |

(Continued)

FOREIGN PATENT DOCUMENTS

CN      1340966      3/2002

(Continued)

OTHER PUBLICATIONS

Chinese Office Action dated Sep. 16, 2005, in corresponding Chinese Patent Application 03142403.1.

(Continued)

Primary Examiner—David Ometz
Assistant Examiner—Jean W. Désir
(74) Attorney, Agent, or Firm—Staas & Halsey LLP

(57) ABSTRACT

A projection television including a CRT assembly projecting image beams and a reflecting mirror reflecting the image beams. The projection television has a support casing having support frames provided on both sides thereof below the reflecting mirror, receiving and supporting the CRT assembly, and a lower frame coupled to the bottom of each support frame, supporting the support frame. With this configuration, the present invention provides a projection television having a support casing whose weight is reduced, thereby facilitating transportation thereof and reducing the cost of production and transportation, etc., and further being unlikely to be deformed or deteriorated because of changes in temperature and humidity.

15 Claims, 5 Drawing Sheets

U.S. PATENT DOCUMENTS

| | | | |
|---|---|---|---|
| 6,661,473 B1 * | 12/2003 | Teshima et al. | 348/787 |
| 6,688,713 B2 * | 2/2004 | Lowe | 312/351.2 |
| 6,833,880 B1 * | 12/2004 | Chen | 348/787 |
| 7,011,416 B2 * | 3/2006 | Cho et al. | 353/119 |
| 2002/0024639 A1 | 2/2002 | Jung | |
| 2002/0036722 A1 | 3/2002 | Hori | |
| 2004/0090603 A1 | 5/2004 | Cho et al. | |
| 2004/0114058 A1 | 6/2004 | Lim | |

FOREIGN PATENT DOCUMENTS

| | | |
|---|---|---|
| EP | 1 137 276 | 9/2001 |
| JP | 60-47372 | 3/1985 |
| JP | 64-5574 | 1/1989 |
| JP | 4-333038 | 11/1992 |
| JP | 5-130540 | 5/1993 |
| JP | 05-130540 | 5/1993 |
| JP | 5-183847 | 7/1993 |
| JP | 6-308602 | 11/1994 |
| JP | 8-138582 | 5/1996 |
| JP | 09-009185 | 1/1997 |
| JP | 10-42230 | 2/1998 |
| JP | 11-261925 | 9/1999 |
| JP | 2001-54039 | 2/2001 |
| KR | 2000-15059 | 7/2000 |
| KR | 2001-78002 | 8/2001 |
| KR | 20-251968 | 10/2001 |
| KR | 10-370217 | 3/2002 |
| KR | 2002-33867 | 5/2002 |

OTHER PUBLICATIONS

Office Action issued by Chinese Patent Office on Nov. 12, 2004.
Office Action; Jul. 22, 2004; Application No.: 10/652,209; Filing Date: Sep. 2, 2003.

* cited by examiner

PROJECTION TELEVISION

CROSS-REFERENCE TO RELATED APPLICATIONS

This application claims the benefit of Korean Patent Application No. 2002-053245, filed Aug. 31, 2002, in the Korean Intellectual Property Office, the disclosure of which is incorporated herein by reference.

BACKGROUND OF THE INVENTION

1. Field of the Invention

The present invention relates, in general, to a projection television, and more particularly, to a projection television having an improved -structure of a support casing for the projection television.

2. Description of the Related Art

Generally, a projection television includes a CRT (Cathode-Ray Tube) assembly projecting image beams, a reflecting mirror reflecting projected beams and a screen displaying thereon pictures based on the reflected beams. Since this type of projection television is commonly equipped with a large-sized screen, it is voluminous and expensive.

As shown in FIGS. 1 and 2, a conventional projection television comprises front and rear casings 110 and 120 defining an external appearance thereof, a wooden support casing 130 formed between the front casing 110 and the rear casing 120, a CRT assembly 140 coupled with the support casing 130, projecting image beams, a reflecting mirror 150 reflecting the image beams, a screen mounted to the front casing 110, and displaying images thereon based on the beams reflected by the reflecting mirror 150, a multiplicity of speakers (not shown) provided in the lower part of the front casing 110, and a circuit board 180 provided in the lower part of the support casing 130, controlling the CRT assembly 140.

In the conventional projection television with this configuration, image beams projected through the CRT assembly 140 are reflected by the reflecting mirror 150 and then transmitted to the screen 160, forming pictures thereon.

However, this conventional projection television has the following problems.

First, since the support casing 130 receiving and supporting the CRT assembly 140 is made of wood sensitive to temperature and humidity, it is likely to be deformed or deteriorated because of changes in temperature and humidity, thereby decreasing the endurance of the projection television.

Second, since the support casing 130 is manufactured with a heavy compressed timber to maintain the intensity thereof constantly, the entire projection television becomes heavy, thereby causing difficulties in transporting it.

Third, since the support casing 130 is manually assembled by means of screws, adhesives, etc., the projection television becomes complicated in structure, thereby increasing the production cost.

Fourth, since the support casing 130 is usually delivered in the condition of being assembled by a lumber dealer or maker, etc., it needs a large space for custody and transportation, thereby increasing the cost thereof.

SUMMARY OF THE INVENTION

Accordingly, it is an aspect of the present invention to provide a projection television having a support casing whose weight is reduced to facilitate transportation thereof, and the support casing being unlikely to be deformed or deteriorated due to changes in temperature and humidity.

Additional aspects and advantages of the invention will be set forth in part in the description which follows and, in part, will be obvious form the description, or may be learned by practice of the invention.

The foregoing and/or other aspects of the present invention are achieved by providing a projection television including a CRT assembly projecting image beams and a reflecting mirror reflecting the image beams, comprising: a support casing having a pair of support frames provided at both sides below the reflecting mirror, receiving and supporting the CRT assembly, and a lower frame coupled to the bottom of each support frame, supporting the support frame.

According to an aspect of the present invention, the support casing further comprises at least one CRT supporting rib, corresponding a projection angle of image beams from the CRT assembly.

According to another aspect of the present invention, the support casing further comprises at least one upper frame, both ends of which are coupled to the top end of each support frame so as to support both of the support frames.

According to yet another aspect of the present invention, the support casing is manufactured with a conductive material so as to block EMI.

According to yet another aspect of the present invention, the support casing is formed of a metallic material.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
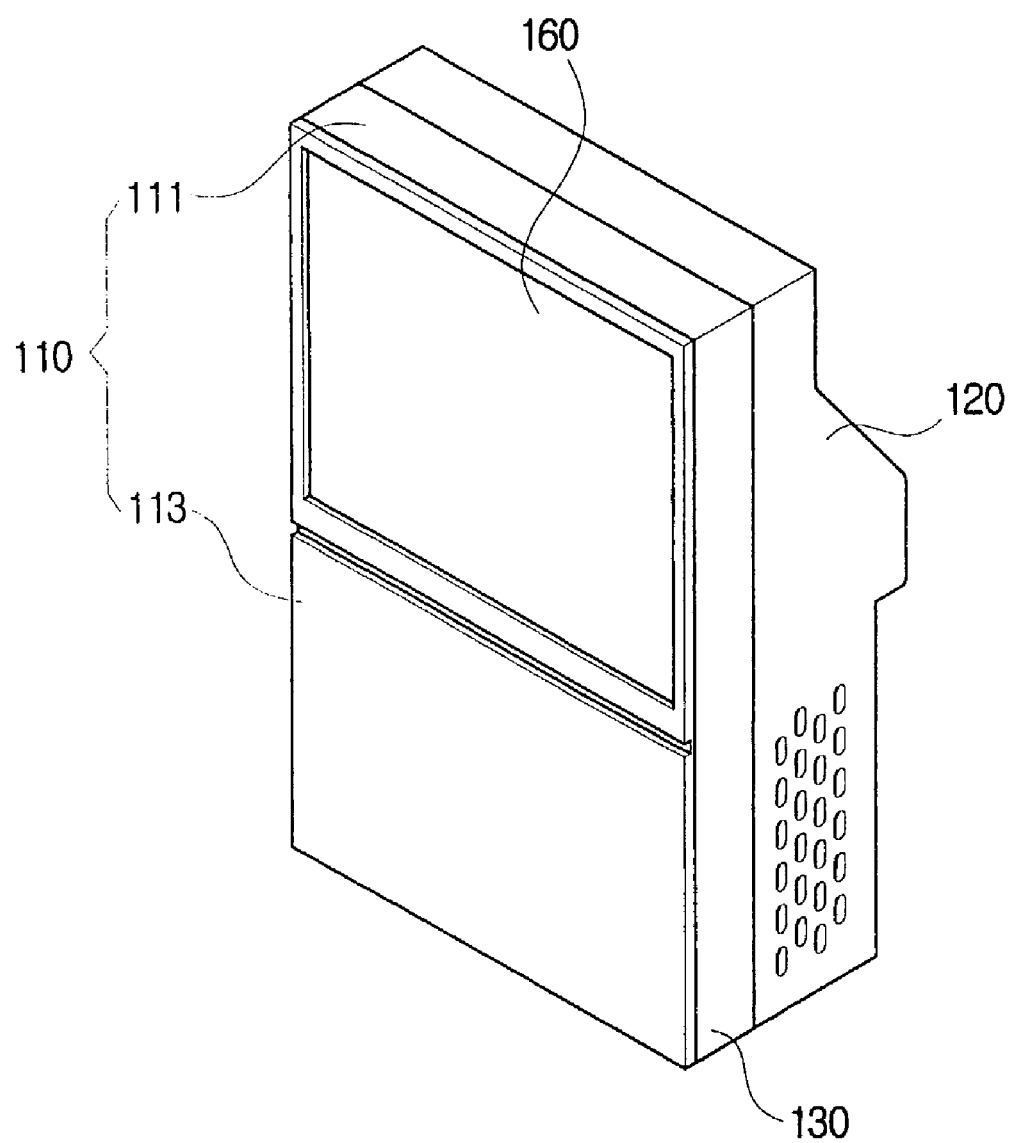
FIG. 1 is an exploded perspective view of a conventional projection television.
Figure 2:
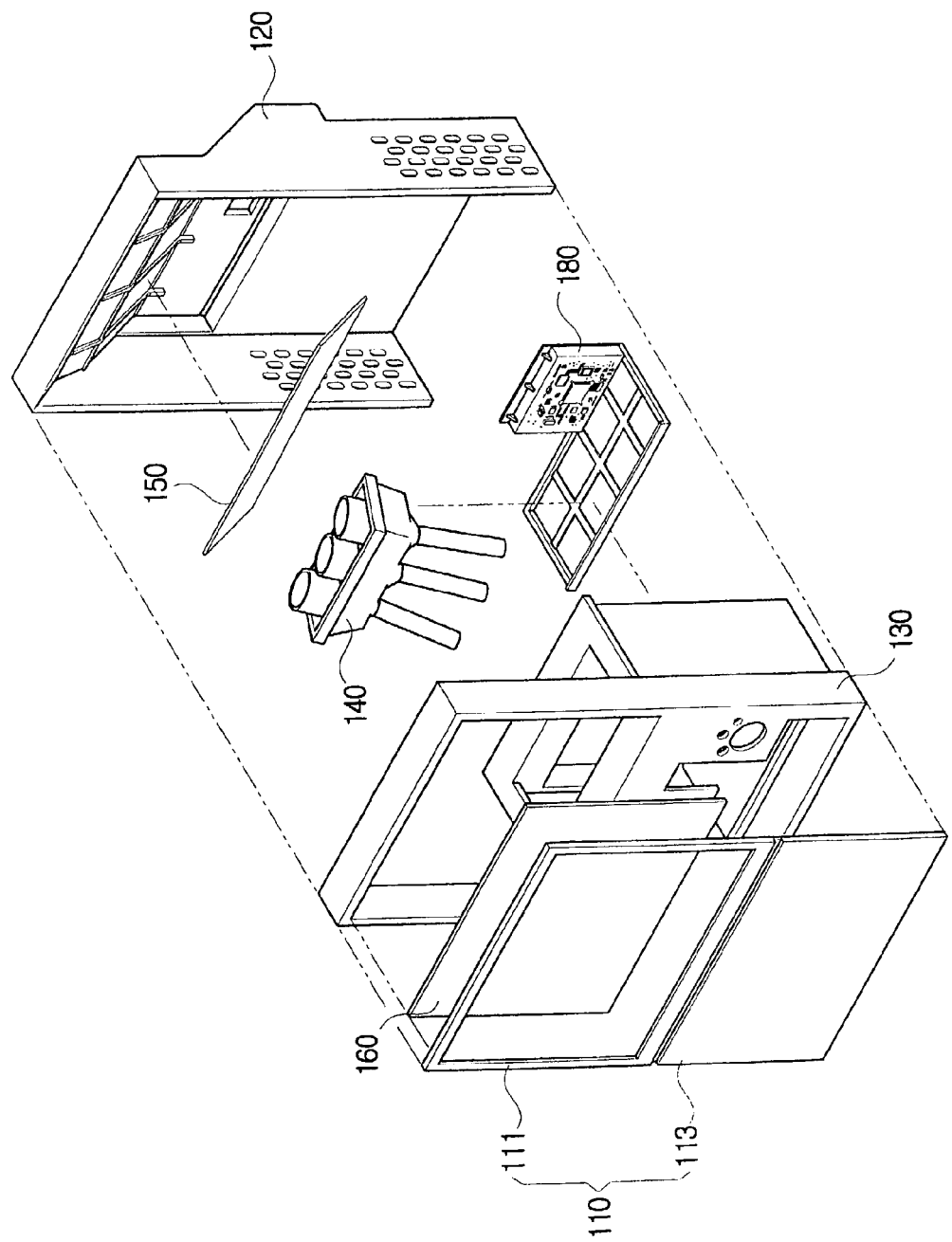
FIG. 2 is an exploded perspective view of the projection television shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
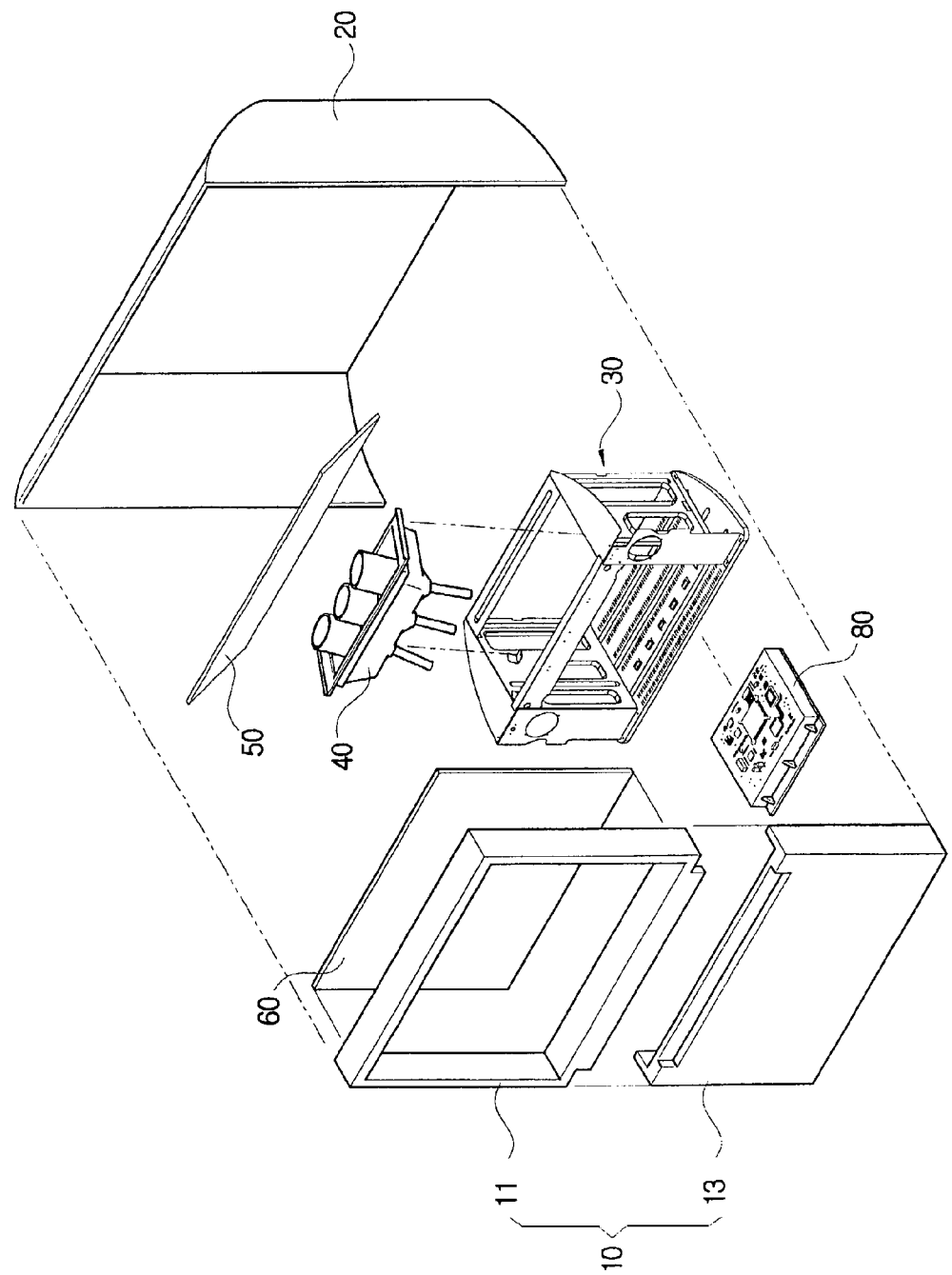
FIG. 3 is an exploded perspective view of a projection television according to an embodiment of the present invention.
Figure 4:
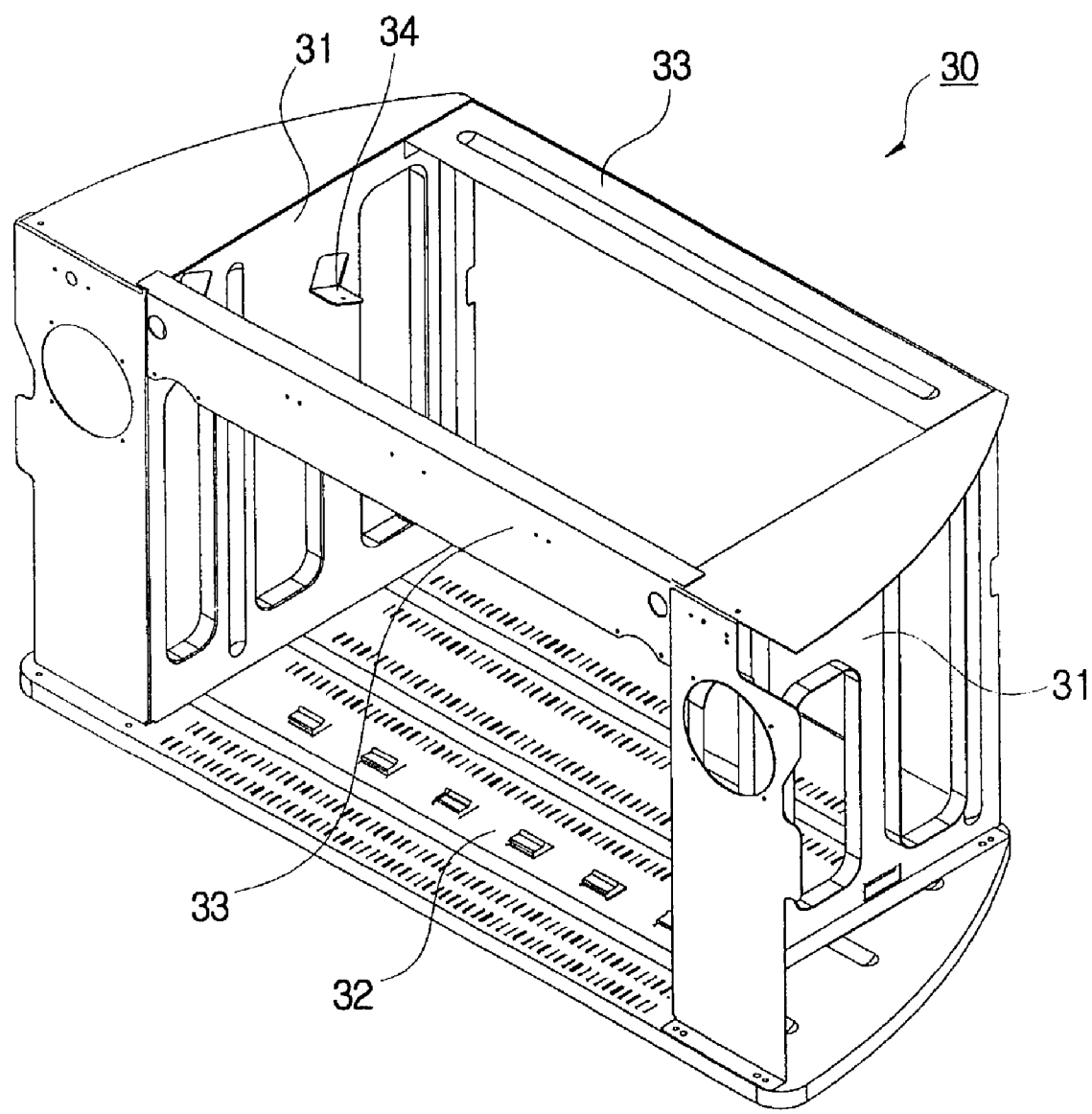
FIG. 4 is a perspective view of a support casing according to the present invention.
Figure 5:
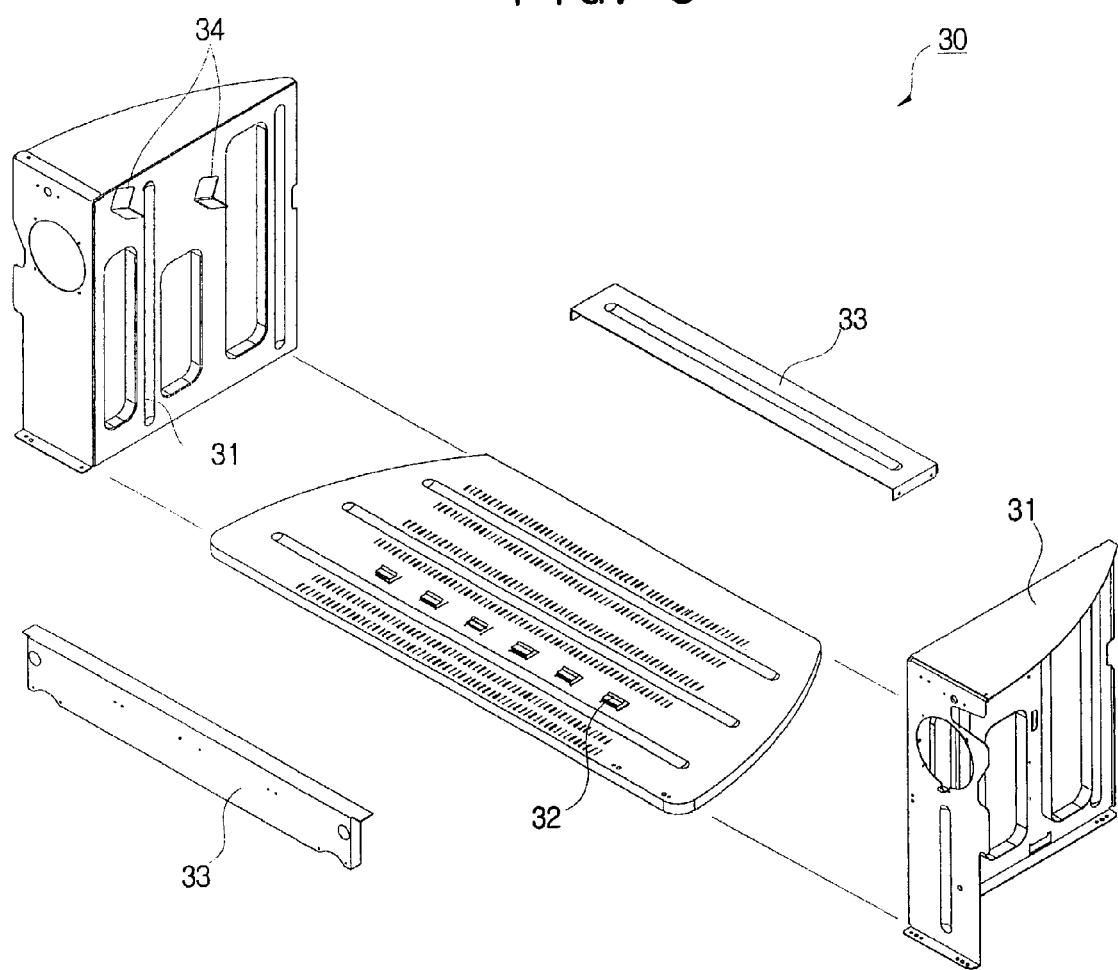
FIG. 5 is an exploded perspective view of the support casing shown in FIG. 4.

As shown in FIGS. 3 through 5, a projection television according to an embodiment of the present invention comprises front and rear casings 10 and 20 defining an external appearance thereof, a wooden support casing 30 formed in an accommodating space provided between the front casing 10 and the rear casing 20, a CRT assembly 40 received within and supported by the support casing 30, projecting image beams, a reflecting mirror 50 reflecting the image beams projected from the CRT assembly 40, a screen displaying images thereon based on the beams reflected by the reflecting mirror 50, and a circuit board 80 provided in the lower part of a support frame 31, controlling the CRT assembly 40.

The front casing 10 defines a front external appearance of the projection television, formed with an upper cover 11 provided on the front top thereof and coupled to the front edge of the screen 60 displaying images thereon so as to support the screen 60, and a lower cover 13 provided in the lower part of the upper cover 11, mounted with a multiplicity of speakers (not shown).

The rear casing 20 defines a rear external appearance of the projection television. On the inside top thereof is provided a reflecting mirror 50 slantingly installed so as to reflect the image beams projected from the CRT assembly 40 and transmit them to the screen 60. The front top of the rear casing 20 is coupled to the upper cover 11 of the front casing 10 by means of screws or the like, and the bottom of the rear casing 20 is coupled to the support casing 30.

The support casing 30, as shown in FIGS. 4 and 5, includes a pair of support frames 31, each support frame provided on opposite sides of the support casing 30 below the reflecting mirror 50, receiving and supporting the CRT assembly 40, and a lower frame 32 coupled to the respective bottoms of the support frames 31, supporting the bottoms of the support frames 31. The bottom of each support frame 31 is coupled to the lower frame 32 by means of screws, but they may be coupled through a welding or the like.

On an inner face of each support frame 31 is provided at least one CRT supporting rib 34 slantingly disposed, corresponding with a projected angle of the image beams from the CRT assembly 40. Two sides of the CRT assembly 40 at the bottom surfaces thereof are slantingly supported by the CRT supporting rib 34, allowing the CRT assembly 40 to project the image beams toward the reflecting mirror 50 positioned above the CRT assembly 40. In the above embodiment of the present invention, a CRT supporting rib 34 is provided in the front and back of the inner face of each support frame 31, thereby forming a pair of supporting ribs 34; but, a CRT supporting rib 34 may slantingly extend to the rear from the front thereof, corresponding with the projected angle of image beams. In addition, the CRT supporting rib 34 may be produced with a conductive metallic material so as to solidly support the CRT assembly 40, easily block EMI (Electromagnetic Interference) from the CRT assembly 40, and discharge the heat generated from many CRTs projecting image beams.

Meanwhile, the tops of both support frames 31 are connected by the upper frame 33. That is, both ends of the upper frame 33 are respectively coupled to the top of each support frame 31, thereby allowing the external appearance of the support casing 30 to be stably maintained. In an aspect of the invention, two upper frames 33 are provided on the top front and the top rear of the support frame 31 so as to maintain the external appearance of the support casing. Here, the upper frame 33 provided in the top front of the support frame 31 may be provided so as to cover the front top of the support frame 31.

The lower frame 32 forms the bottom of the projection television. On the top face thereof is installed the circuit board 80 (see FIG. 3). Also, on the bottom face of the lower frame 32 are provided wheels on four corners thereof so as to improve mobility of the projection television.

It is an aspect of the invention that the support casing 30 is manufactured by an injection molding with plastics to decrease the production cost and to facilitate mass production thereof. However, the support casing 30 may be formed of a conductive metallic material manufactured by a press or a mold, so as to easily block EMI generated from the circuit board 80 provided in the lower frame 32.

In the above-described embodiment, the parts of the support casing 30 are coupled by screws. This screw-coupling has been known to the public, and thus, a description about this will be omitted. In place of the screw-coupling, they may be coupled with the use of such coupling members as projection and holes, welding, etc.

In the projection television according to the present invention, since the support casing 30 receiving and supporting the CRT assembly 40 is formed of a metallic or plastic material, the entire weight of the projection television is reduced in comparison with the conventional wooden support casing, thereby facilitating transportation thereof and decreasing the cost for storage and transportation as well as of the production.

Also in the projection television according to the present invention, since the support casing 30 is molded by a press or a mold, it is not deformed or deteriorated due to the changes in temperature and humidity, it can also easily discharge out the heat generated in the CRT assembly, and easily block EMI from the CRT assembly.

As described above, according to the present invention there has been provided a projection television having a support casing whose weight is reduced, thereby facilitating transportation thereof and reducing the cost for production and transportation, etc., and further being unlikely to be deformed or deteriorated because of changes in temperature and humidity.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A projection television including a CRT assembly projecting image beams and a reflecting mirror reflecting the image beams, further comprising:

a support casing having a pair of support frames, each support frame provided on opposite sides of the support casing below the reflecting mirror, receiving and supporting the CRT assembly, and a lower frame coupled to the bottom of each support frame to support the support frames, wherein the support casing further comprises at least one CRT supporting rib projecting inward from the inside of each support frame and slantingly disposed, corresponding to a projection angle of image beams from the CRT assembly, and wherein the support casing further comprises at least one upper frame having an end coupled to the top end of each support frame to support both of the support frames.

2. The projection television according to claim 1, wherein the support casing comprises a conductive material to block EMI.

3. The projection television according to claim 2, wherein the support casing is formed of a metallic material.

4. The projection television according to claim 2, wherein the support casing is formed of a plastic material.

5. The projection television according to claim 1, wherein the at least one CRT supporting rib comprises a first supporting rib provided in the front of each support frame and a second supporting rib provided in the back of each support frame.

6. The projection television according to claim 1, wherein the bottom of each support frame is coupled to the lower frame by screws.

7. The projection television according to claim 1, wherein the bottom of each support frame is coupled to the lower frame by welding.

8. The projection television according to claim 1, wherein the support casing is manufactured by an injection molding with plastics.

9. The projection television according to claim 1, wherein two sides of the CRT assembly are slantingly supported at the bottom ends thereof by a respective supporting rib.

10. The projection television according to claim 1, further comprises upper frames are provided, one at the top front of the support frame and one at the top rear of the supporting frame.

11. The projection television according to claim 10, wherein the upper frame provided at the top front of the support frame covers the front top of the support frame.

12. A projection television comprising:
a front casing;
a rear casing;
a CRT assembly projecting image beams;
a reflecting mirror reflecting the image beams; and
a support casing supporting both sides of the reflecting mirror and receiving and supporting the CRT assembly,
wherein the support casing has a pair of support frames,
wherein the support casing further comprises at least one CRT supporting rib projecting inward from the inside of each support frame and slantingly disposed, corresponding to a projection angle of image beams from the CRT assembly, and
wherein the support casing further comprises at least one upper frame having an end coupled to the top end of each support frame to support both of the support frames.

13. The projection television according to claim 12, wherein the support casing is formed of a plastic material.

14. The projection television according to claim 13, wherein the support mold is molded by a press or a mold.

15. The projection television according to claim 12, wherein the support casing is formed of a metallic material that blocks EMI generated within the projection television.

* * * * *